Figure 1:
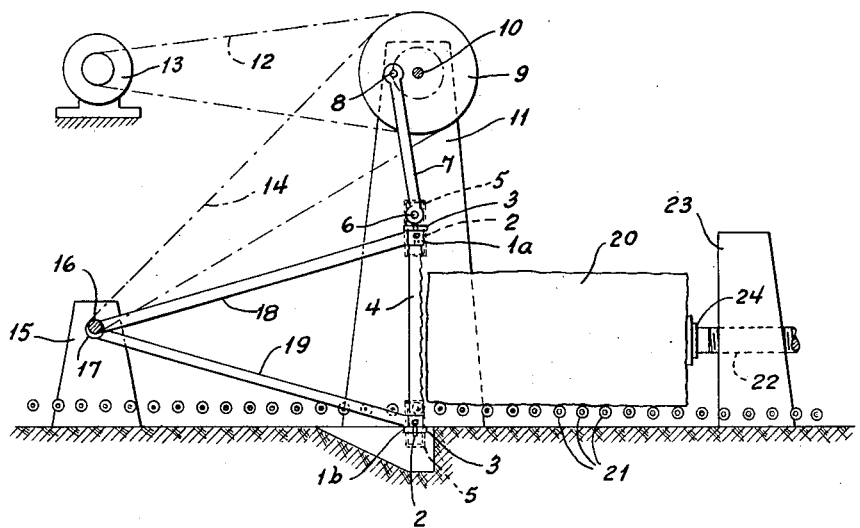

Sept. 6, 1960  P. G. LEO  2,951,475
SAWING OF STONE BLOCKS

Filed June 11, 1958  2 Sheets-Sheet 1

PER GUNNAR LEO
INVENTOR.

BY *Albert M. Parker*

ATTORNEY.

Sept. 6, 1960  P. G. LEO  2,951,475
SAWING OF STONE BLOCKS
Filed June 11, 1958  2 Sheets-Sheet 2

PER GUNNAR LEO
INVENTOR.

BY
ATTORNEY.

United States Patent Office 2,951,475
Patented Sept. 6, 1960

2,951,475

SAWING OF STONE BLOCKS

Per Gunnar Leo, Stockholm, Sweden, assignor to Hyresgasternas Sparkasse-och Byggnadsforeningars Riksforbund upa, Stockholm, Sweden, a corporation of Sweden and Ivan Fredrick Lundquist, Bromma, Sweden Filed June 11, 1958, Ser. No. 741,353

2 Claims. (Cl. 125—16)

This invention relates to a method and an arrangement for sawing of stone blocks, especially of marble and limestone.

Several different types of saws intended for sawing marble blocks have previously been suggested. These constructions of saws have in common the feature that they consist of an approximately horizontal saw-frame with several mainly parallel sawblades. These are, as a rule, equipped with teeth of hard metal or diamond, although certain types also lack teeth. In the course of the sawing operation the sawblades work their way downwards through the block of marble and divide this into a number of sheets or slabs. A disadvantage of this type of sawing machine is that the sawblades must be relatively long, as the marble block as a rule has its longest dimension in horizontal direction so as to enable production of as long slabs of marble as possible. The great length of blades cause that the saw-blades easily bend if they are not made of rather thick metal. It is desirable, however, to have as thin sawblades as possible so that the sawcuts shall not be too wide. The possibility of placing the marble block on its narrow end in order to carry out the sawing in this position is, on the other hand, excluded in practice because of the increased constructional height which this performance would call for in the saw.

The present invention aims at overcoming all these disadvantages by carrying out the sawing operation with the longitudinal direction of the sawblades in an essentially vertical position, the sawblades being adapted to work into the block by a horizontal, mutual feed between the sawframe and the block, and the sawing being effected while utilizing sawblades which have a shorter effective length than the horizontal dimension of the stone block.

The feed can be effected either by moving the block towards the sawblades or by feeding the sawblades towards the block, or by both these movements. It is possible to use relatively short sawblades due to the fact that the longitudinal direction of the sawblades is vertical, at the same time as the dimension of the block in vertical direction is less than its dimension in horizontal direction. The blades can then be made thin while still being sufficient rigid. Short blades are also cheaper than long ones, so that it is not so costly to change a blade if it should be damaged or become worn out. The fact that the blades are thin also enables them to be arranged nearer one another and thus makes it possible to saw out relatively thin slabs of great length, as a rule many times longer than the length of the sawblades.

If the sawblades have teeth of hard metal or other hard material (for example diamonds) the upward and downward movement of the blades while sawing should be such that the teeth, in a manner known in itself, shall only engage the bottom of the sawcut during the working stroke but not at all, or at least not with any material pressure, during the return stroke. Thus, the sawing machine according to the invention comprises a mainly vertical sawframe adapted to move in an upward and downward direction and having a plurality of parallel, vertical sawblades with hard metal teeth, the effective length of each sawblade being shorter than the horizontal length of the stone block to be sawn, a driving arrangement for the sawframe adapted to impart to said sawframe a motion such that the sawblades mainly will act into the block of stone when moving in one direction only while the sawblades will not engage the block with any appreciable pressure during the return movement, and a feed arrangement for mutual feeding between the sawframe and the block in a horizontal direction towards each other. The contact with the block at the beginning of each working stroke should be effected along a smooth curve, or at an acute angle, in order to avoid too violent pressure against the working teeth. The sawblades can if desired be caused to move approximately in a figure-eight-track in the vertical plane, the essentially vertical sawframe then being suspended to rotate or oscillate on horizontal axle spindles at its central portion and at the same time caused to perform a vertical movement upwards and downwards.

Figure 2:
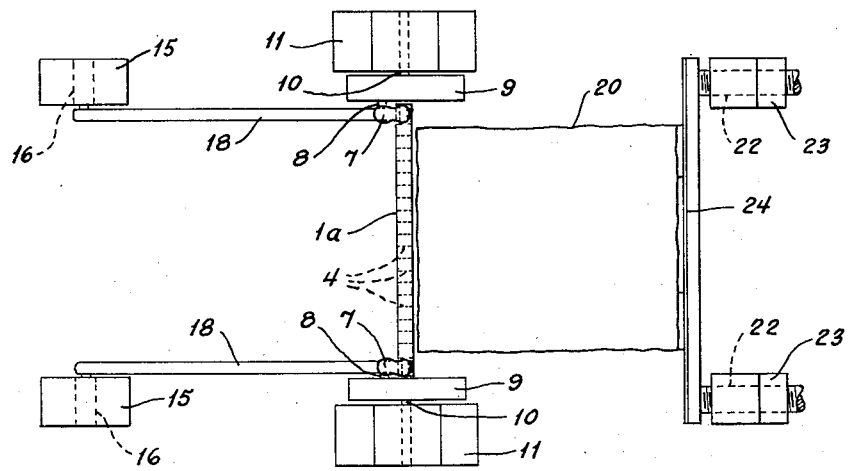
Figure 3:
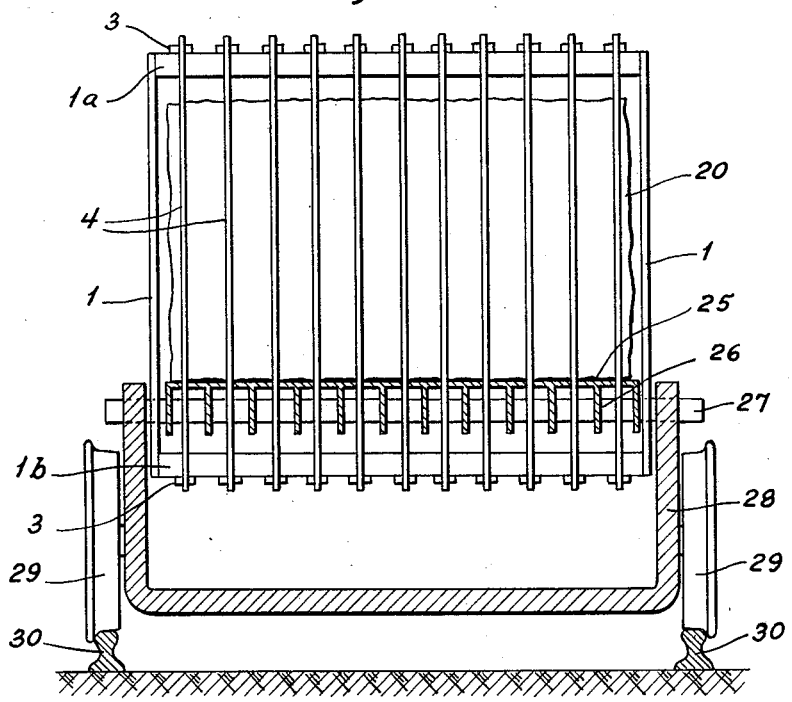
Figure 4:
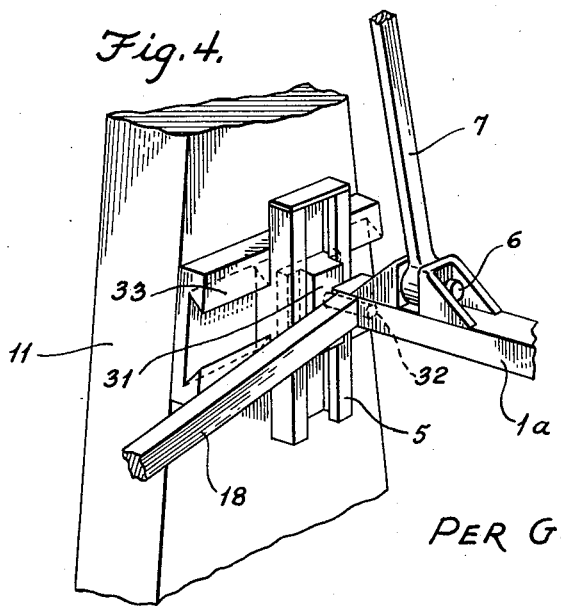

One embodiment of a sawing machine according to the invention is shown in the accompanying drawings, in which Fig. 1 is a diagrammatical side view, Fig. 2 a horizontal view, Fig. 3 an end view, partly in cross-section of a somewhat modified construction, and Fig. 4 is a perspective view of the suspension and guiding means of the saw frame.

According to the embodiment shown the sawing machine comprises an essentially vertical sawframe having horizontal top and bottom parts 1a and 1b respectively. Between these a number of parallel vertical sawblades 4, if desired, provided with teeth of a hard material, are attached in a known manner, for example by means of angle irons 2, and wedges 3. Frame parts 1a, 1b are connected to slides, not shown, which slide in vertical guides 5. One end of a connecting rod 7 is journalled on a shaft 6 in the top slide on both sides of the sawframe. The other end of connecting rod 7 is journalled on a crank pivot 8 on a fly wheel 9, or such like, mounted on the shaft 10 and which is driven by a motor 13 via a transmission belt 12. Standards or stands 11 support wheels 9.

As shown in Figure 4 which illustrates the guiding mechanism at the sawframe end of the rod 18 the top frame part 1a is connected to a vertically sliding block 31 by means of a pivot 32. The block 31 can slide in the vertical guide 5, which in turn can slide in a horizontal guide 33 to the extent admitted by the motion of the rod 18. A similar guiding mechanism is arranged at the opposite end of the top part 1a and at the ends of the bottom part 1b adjacent the rods 19.

The movement from motor 13 is also imparted through a transmission belt 14 to shafts 16, which are journalled in stands 15 and are provided with eccentrics 17. These are connected by rods 18, 19 to parts 1a and 1b respectively of the sawframe.

The transmission arrangement now described results in a motion upwards and downwards of the sawframe in relation to the block of stone 20, which rests on a suitable foundation or base. Guides 5 are journalled on pivots so as to permit an oscillating movement of the saw frame under the action of the eccentrics 16. As a result the sawblades 4 will gradually contact block 20 along a smooth curve during the working stroke, but during the return movement they will not engage the bottom of the sawcut with any material pressure. The movement is in principle the same as that described in U.S.

patent specification No. 2,480,942, although in the present case the motion will take place in a horizontal instead of a vertical direction.

The feeding of block 20 can be effected in many different ways. The drawing shows in Figs. 1 and 2 an example in which the block rests on a roller way or sliding plane 21. The feed arrangement consists, for example, of feed screws 22, which are suitably driven and journalled in supports 23 and, with their heads 24, contact plane parts at the narrow end of block 20.

The feeding arrangement can, of course, also be made in a different manner. One can also feed the entire sawing machine in a horizontal direction, that is to say in the longitudinal direction of block 20 instead of feeding the latter.

Fig. 3 shows a slightly different embodiment with blocks 20 resting on a base 25 of boards, which, in their turn, rest on a number of flanges 26. These are supported by rods 27 which are inserted in a carriage 28. The carriage has wheels 29 for moving on rails 30. With this device sawblades 4 inserted in frame 1 move in the intervening space between flanges 26 and saw through block 20 and board base 25 at the same time. As the sawblades reach rods 27 these are withdrawn manually in succession from carriage 28 so as to be inserted again in their places once the sawblades have passed the position of each rod. Block 20 will thus be supported all the time by flanges and rods 27, while carriage 28 is simultaneously being fed towards the sawblades.

What I claim is:

1. A stone sawing machine for sawing blocks of stone, especially of marble and limestone, comprising a substantially vertical saw-frame having a plurality of parallel saw blades extending between the upper and the lower sides thereof, driving means for imparting to said saw-frame a substantially vertical reciprocating motion, guiding means slidably supporting said saw frame and pivotally journalled to provide oscillating movement of the saw frame, eccentric means for reciprocating said guiding means transversely to said vertical reciprocating motion and so as to cause said saw blades to move along longitudinally extending elliptical paths, means for controlling said elliptical paths for adjusting the shape and the inclination of the main axis thereof, and means for movably supporting said stone block so as to allow passage of said saw blades in an opposite direction to the direction of movement of the stone.

2. A stone sawing machine for sawing blocks of stone, especially of marble and limestone, comprising a substantially vertical saw-frame having a plurality of parallel saw blades extending between the upper and the lower sides thereof, driving means for imparting to said saw frame a substantially vertical reciprocating motion, guiding means slidably supporting said saw frame, means for reciprocating said guiding means transversely to said vertical reciprocating motion and so as to cause said saw blades to move along longitudinally extending elliptical paths, means for controlling said elliptical paths for adjusting the shape and the inclination of the main axis thereof, means for movably supporting said stone block so as to allow passage of said saw blades in an opposite direction to the direction of movement of the stone, said supporting means for movably supporting the stone block comprising a carriage, said carriage comprising longitudinally extending supporting flanges for the stone, said flanges being transversely spaced in correspondence with the spacing of the said saw blades so as to allow said saw blades to pass between them, and rod shaped supporting means for supporting said flanges, said rod shaped means extending transversely of said flanges and mounted on said supporting means for ready removal and replacement so as to be temporarily removable from their places to allow said saw blades to pass in a direction opposite to the progressing direction of the stone.

References Cited in the file of this patent

UNITED STATES PATENTS

| | | |
|---|---|---|
| 194,957 | Cottrell | Sept. 11, 1877 |
| 578,116 | Peckover | Mar. 2, 1897 |
| 2,712,307 | Stalheim | July 5, 1955 |
| 2,815,745 | Woodward | Dec. 10, 1957 |

FOREIGN PATENTS

| | | |
|---|---|---|
| 9,858 | Great Britain | Aug. 1, 1843 |
| 54,089 | Switzerland | Dec. 5, 1911 |
| 489,542 | Italy | Jan. 23, 1954 |